(12) United States Patent
Chi et al.

(10) Patent No.: US 12,320,671 B2
(45) Date of Patent: Jun. 3, 2025

(54) DEVICE POSITIONING DETECTION CALIBRATION SYSTEMS AND METHODS

(71) Applicant: Dell Products L.P., Round Rock, TX (US)

(72) Inventors: Wei-Hsiang Chi, Taipei (TW); Tyler Ryan Cox, Austin, TX (US); Yi-Ming Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 18/150,305

(22) Filed: Jan. 5, 2023

(65) Prior Publication Data

US 2024/0230372 A1    Jul. 11, 2024

(51) Int. Cl.
*G01C 25/00* (2006.01)
*G01C 21/12* (2006.01)
*G01S 13/74* (2006.01)

(52) U.S. Cl.
CPC .......... *G01C 25/005* (2013.01); *G01C 21/12* (2013.01); *G01S 13/74* (2013.01)

(58) Field of Classification Search
None
See application file for complete search history.

(56) References Cited

U.S. PATENT DOCUMENTS

| 2011/0133918 A1* | 6/2011 | Lee | B62J 50/22 340/436 |
| 2018/0041241 A1* | 2/2018 | Trotta | H04B 1/385 |
| 2024/0230831 A1* | 7/2024 | Dhekne | G01S 5/021 |

* cited by examiner

*Primary Examiner* — Lisa M Caputo
*Assistant Examiner* — Cynthia L Davis
(74) *Attorney, Agent, or Firm* — Norton Rose Fulbright US LLP

(57) ABSTRACT

Systems and methods described herein include a testing apparatus on which a peripheral device may be secured in a predefined, consistent orientation. The peripheral device includes a UWB antenna on a first printed circuit board that is at an angle to a second printed circuit board including one or more positioning sensors. The testing apparatus includes multiple wireless respondents at predefined distances and orientations relative to the peripheral device secured to the testing apparatus. A computing device generates a calibration vector based on measured vectors from the first printed circuit board to the wireless respondents and predetermined vectors from the second printed circuit board to the wireless respondents. The calibration vector is used to calibrate a positioning algorithm of the peripheral device that determines a position and orientation of the peripheral device relative to the peripheral device's environment.

19 Claims, 11 Drawing Sheets

DEVICE POSITIONING DETECTION CALIBRATION SYSTEMS AND METHODS

FIELD OF THE DISCLOSURE

The instant disclosure relates to information handling systems. More specifically, portions of this disclosure relate to positioning detection of a device in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Aspects of embodiments of this disclosure involve a peripheral device (e.g., a gaming controller) and method for calibrating a positioning algorithm of the peripheral device that detects an orientation of the peripheral device relative to the peripheral device's environment. Typically, an ultra-wideband (UWB) antenna is on a same fixed board surface as a peripheral device's other positioning sensor(s) (e.g., accelerometer, gyroscope, and magnetometer) and therefore the UWB antenna and the positioning sensor(s) are all oriented in a fixed direction relative to one another. Embodiments of the provided peripheral device, however, include a UWB antenna on a UWB board that is at an angle (e.g., roughly 45°) to a main board including the positioning sensor(s). The UWB antenna is therefore oriented in a different direction relative to the positioning sensor(s). Additionally, there is mechanical tolerance in the design of the UWB board and mainboard at an angle to one another, and therefore not every instance of the provided peripheral device has the UWB board and the mainboard at the exact same angle. Accordingly, embodiments of this disclosure provide for calibrating a peripheral device's positioning algorithm, which takes input data from the UWB antenna and positioning sensor(s) to ensure positioning accuracy of the peripheral device, based on the angle between the UWB board and the mainboard for that particular peripheral device.

Aspects of embodiments of this disclosure include a testing apparatus on which a peripheral device may be secured in a predefined, consistent orientation. As stated above, the peripheral device includes a UWB antenna on a UWB board that is at an angle to a mainboard including one or more positioning sensors. The testing apparatus includes multiple (e.g., three) wireless respondents at predefined distances and orientations relative to the peripheral device secured to the testing apparatus. Because the peripheral device is secured in a predefined orientation, an orientation (e.g., a positional vector) of the mainboard to each of the wireless respondents is known. An orientation (e.g., positional vector) of the UWB board to each of the wireless respondents can be determined based on signals received from the wireless respondents.

The positional vector(s) of the mainboard and the positional vector(s) of the UWB board are added together to generate a calibration vector. The calibration vector can be stored in a memory of the peripheral device as positioning reference information to be used to calibrate the peripheral device's positioning algorithm when the peripheral device is in use. Stated differently, the calibration vector is a transformation vector that enables a summation of a vector indicative of a direction that the UWB board is pointing and a vector indicative of a direction that the positioning sensor(s) are pointing. The positioning algorithm takes into account both the UWB board vector and the positioning sensor(s) vector in order to determine an orientation of the peripheral device; however, when the exact angle between the UWB board and the mainboard is not known, problems are introduced to add the UWB board vector and the positioning sensor(s) vector together. The generated calibration vector solves these problems by enabling the UWB board vector and the positioning sensor(s) vector to be added together.

In at least some embodiments, a computing device can be connected either to the fixture or directly to the peripheral device such that the computing device is in communication with the peripheral device. In such embodiments, the computing device manages the calibration procedure to generate the calibration vector.

In various embodiments, the provided peripheral device includes a fixture designed to maintain the angle between the UWB board and the mainboard. The fixture helps to reduce the mechanical tolerance between the UWB board and the mainboard. In an example, the UWB board is fitted with a guide structure that is attached to the peripheral device's chassis (e.g., via screws) to maintain a position of the UWB board relative to the mainboard.

In some embodiments, the aspects described herein may be used to support the execution of gaming applications in different environments. Gaming sessions may execute on a service, seither locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. As such, accurate positioning measurement of the gaming controller is vital for user gameplay experience. For instance, accurately determining where the gaming controller is in the user's home can ensure seamless transitions of gaming applications between the different environments of the user's home. Additionally, accurately determining an orientation of the gaming controller within any particular environment can aid in actions during gameplay. Embodiments of the disclosure herein provide a compact gaming controller having an ultra-wideband (UWB) board at an angle to a mainboard and a calibration system for accurate positioning measurement of the gaming controller.

The solution for supporting the execution of gaming applications in different environments accommodates multiple users simultaneously within the home, whether in single player, multiplayer using the same screen, or multi-player using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a system includes a peripheral device, a testing apparatus, and a computing device. The peripheral device comprises a first printed circuit board at an angle to a second printed circuit board. The first printed circuit board includes an ultra-wideband (UWB) antenna and the second printed circuit board includes at least one positioning sensor. The testing apparatus comprises a first region configured to secure the peripheral device in a predetermined orientation and a second region including a plurality of wireless respondents. The computing device is in communication with the peripheral device when the peripheral device is secured in the first region of the testing apparatus. The computing device comprises a memory and a processor in communication with the memory. The processor configured to perform the operations comprising: determining, for each of the plurality of wireless respondents, a vector from the first printed circuit board to a wireless respondent of the plurality of wireless respondents; and generating a calibration vector based on the determined vectors and a plurality of predefined vectors from the second printed circuit board to each of the wireless respondents.

In certain embodiments, the angle between the first printed circuit board and the second printed circuit board is within a range of 40 to 50 degrees.

In certain embodiments, the at least one positioning sensor includes an accelerometer, a gyroscope, and a magnetometer.

In certain embodiments, the peripheral device further comprises: a chassis configured to house the first and second printed circuit boards; and a guide structure configured to attach to the chassis and thereby maintain a positioning of the first printed circuit board.

In certain embodiments, the calibration vector is a sum of the determined vectors and the predefined vectors.

According to one embodiment, a method includes securing a peripheral device in a predetermined orientation in a first region of a testing apparatus, the testing apparatus further comprising a second region including a plurality of wireless respondents. The peripheral device comprises a first printed circuit board at an angle to a second printed circuit board. The first printed circuit board includes an ultra-wideband (UWB) antenna and the second printed circuit board includes at least one positioning sensor. The method further includes determining, with a computing device and for each of the plurality of wireless respondents, a vector from the first printed circuit board of the peripheral device to a wireless respondent of the plurality of wireless respondents. The method further includes generating, with the computing device, a calibration vector based on the determined vectors and a plurality of predefined vectors from the second printed circuit board of the peripheral device to each of the wireless respondents.

According to another embodiment, an apparatus comprises a first printed circuit board and a second printed circuit board disposed at an angle to the first printed circuit board. The first printed circuit board includes an ultra-wideband (UWB) antenna. The second printed circuit board includes at least one positioning sensor. The apparatus further comprises a memory storing a positioning algorithm and a calibration vector, and a processor in communication with the memory, the processor configured to execute the positioning algorithm using the calibration vector. The positioning algorithm is configured to determine at least one of a position of the apparatus and an orientation of the apparatus.

In certain embodiments, the calibration vector enables a summation of a vector indicative of a direction that the first printed circuit board is pointing and a vector indicative of a direction that the at least one positioning sensor on the second printed circuit board is pointing.

In certain embodiments, the calibration vector is determined by a calibration method that generates a sum of: (1) a plurality of vectors from the first printed circuit board to a plurality of wireless respondents and (2) a plurality of vectors from the second printed circuit board to the plurality of wireless respondents.

At least a portion of the method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory. According to one embodiment, a computer program product includes a non-transitory, computer-readable medium comprising code for performing steps comprising determining, for each of a plurality of wireless respondents positioned in a second region of a testing apparatus, a vector from a first printed circuit board of a peripheral device to a wireless respondent of the plurality of wireless respondents. The peripheral device is secured in a predetermined orientation in a first region of the testing apparatus, and the peripheral device comprises the first printed circuit board at an angle to a second printed circuit board. The first printed circuit board includes an ultra-wideband (UWB) antenna and the second printed circuit board includes at least one positioning sensor. The steps of the code further comprise generating, with the computing device, a calibration vector based on the determined vectors and a plurality of predefined vectors from the second printed circuit board of the peripheral device to each of the wireless respondents.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
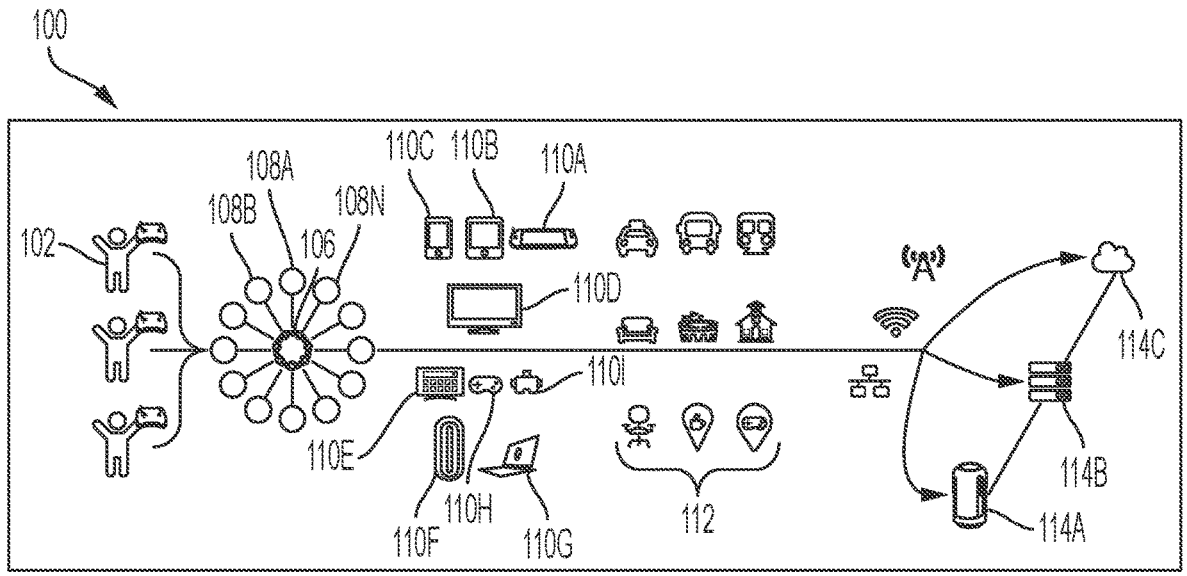
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according to some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
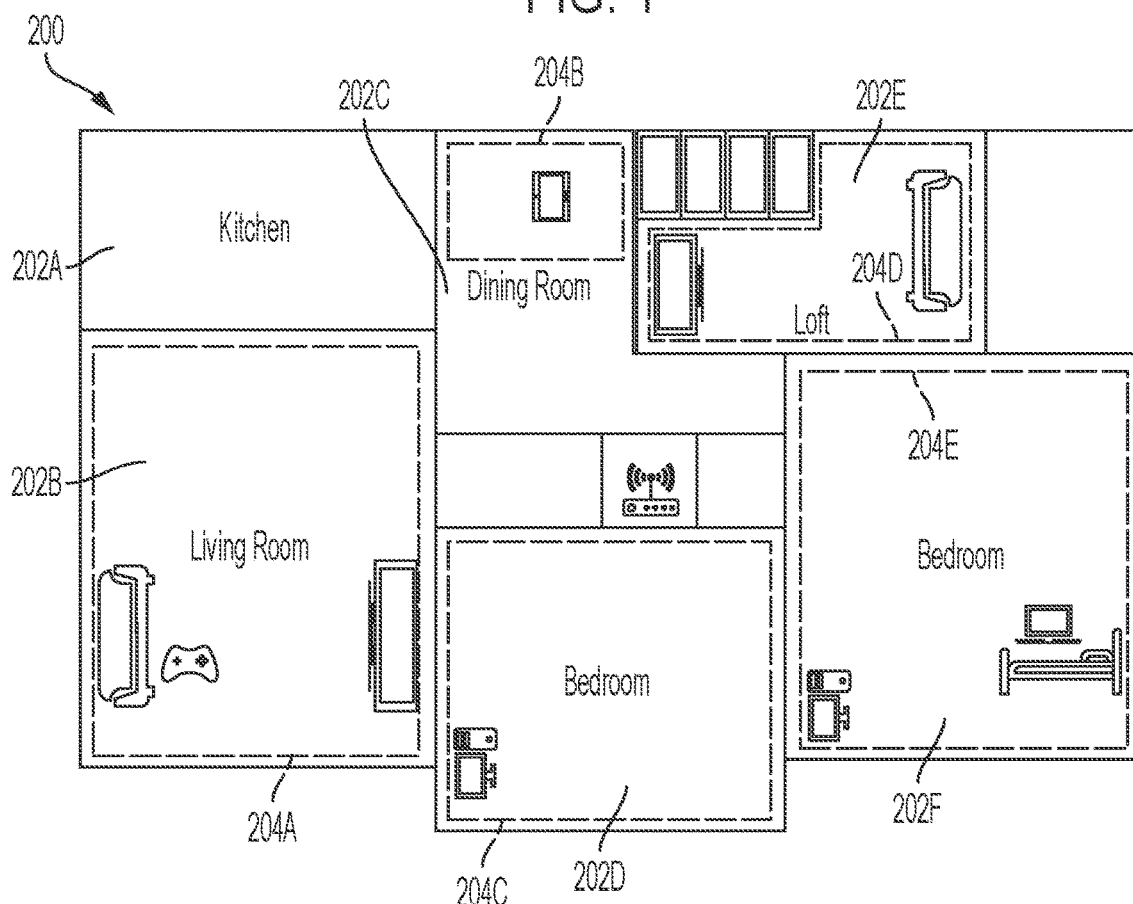
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
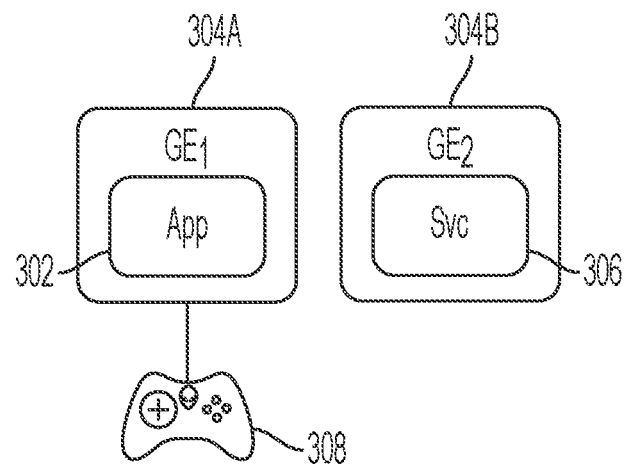
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
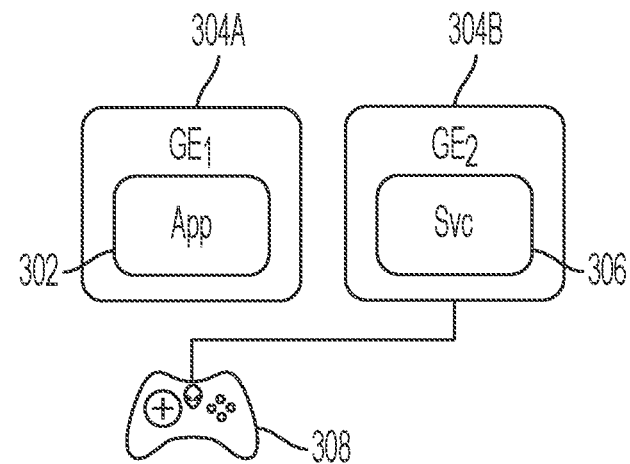
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
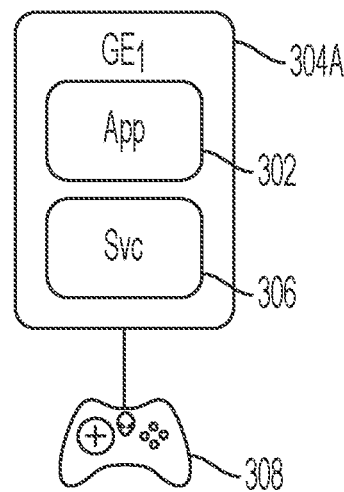
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
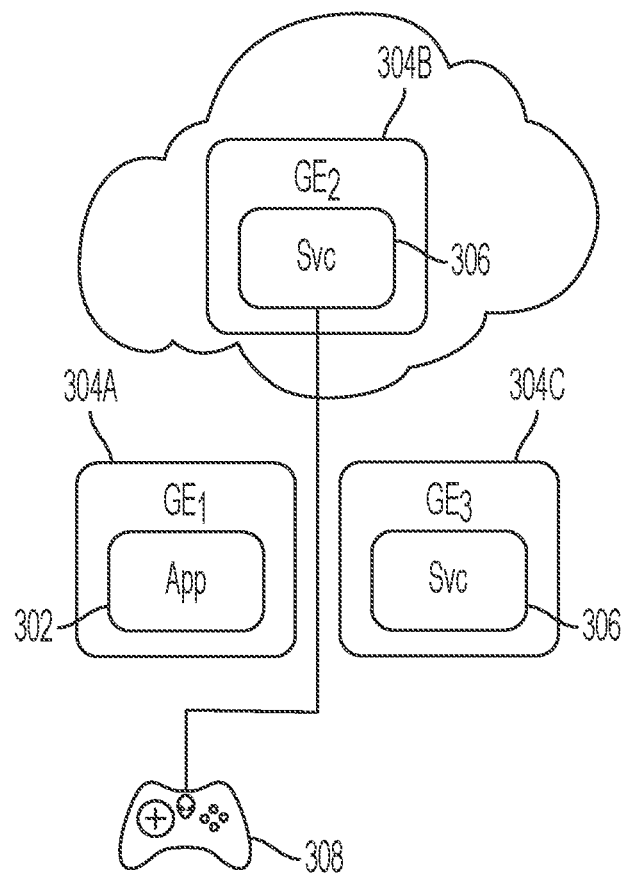
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
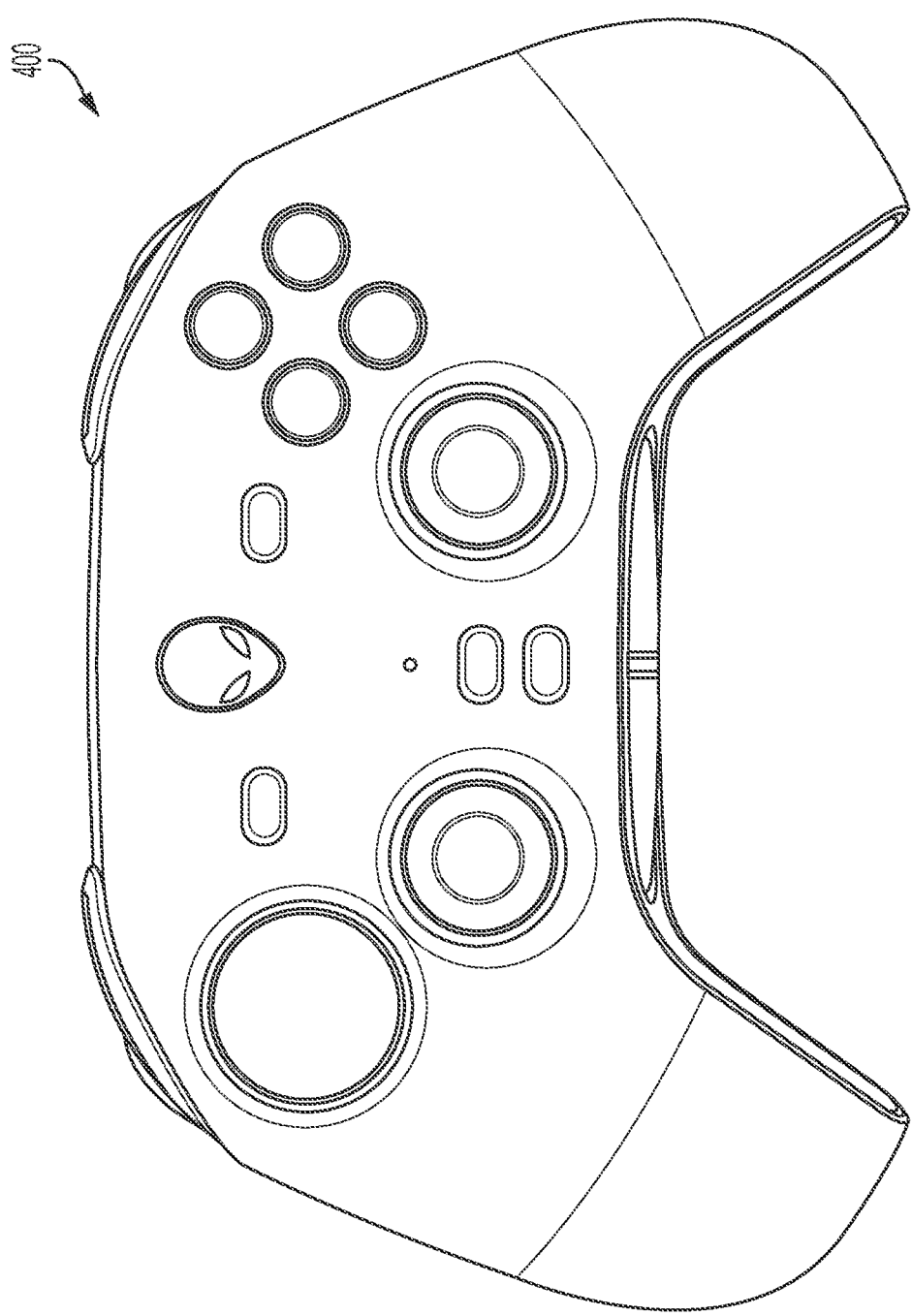
FIG. 4 is a front view of a peripheral device according to some embodiments of the disclosure.
Figure 5:
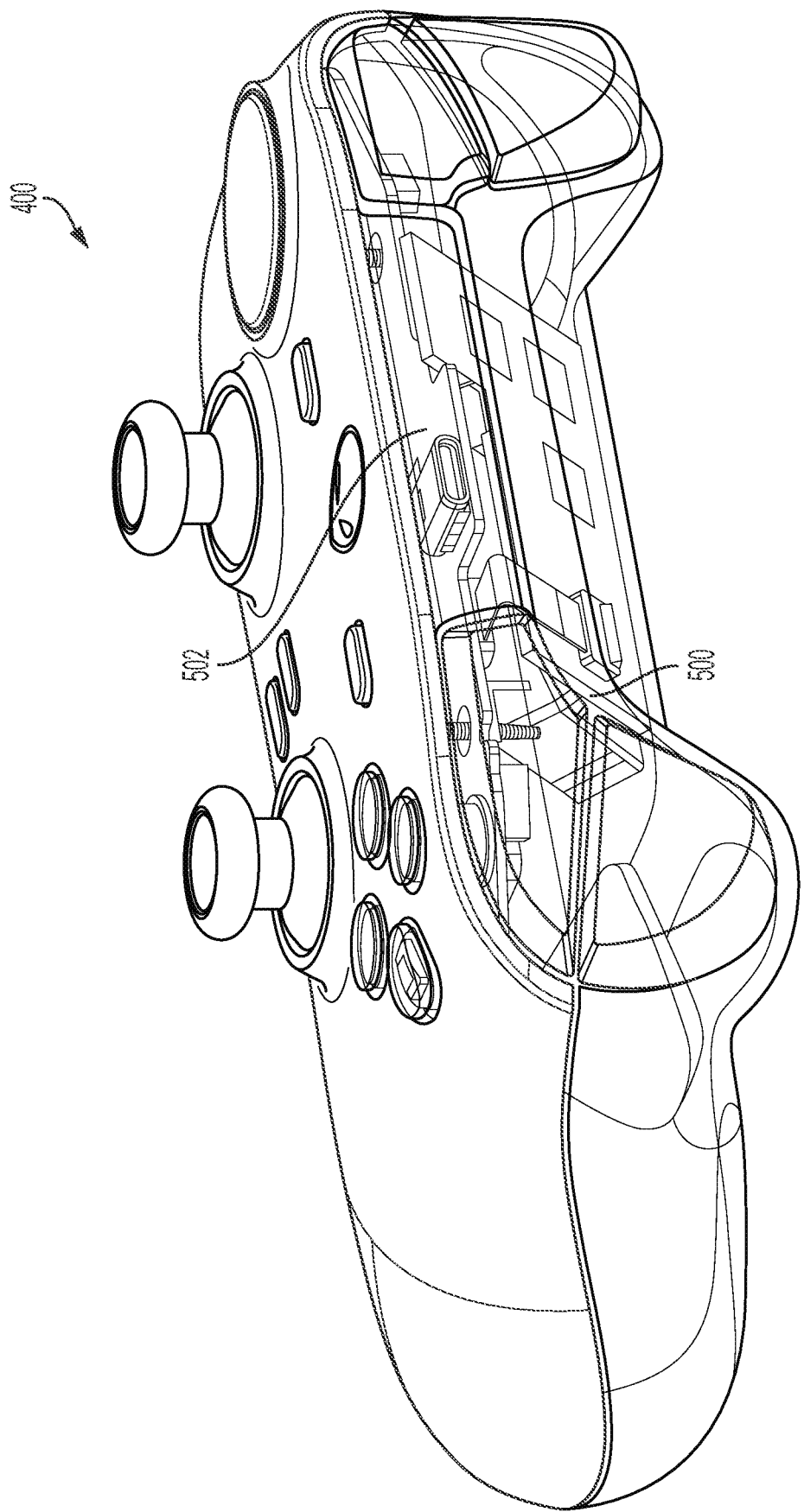
FIG. 5 is a perspective view of the peripheral device of FIG. 4 with a transparent portion of the outer chassis according to some embodiments of the disclosure.
Figure 6:
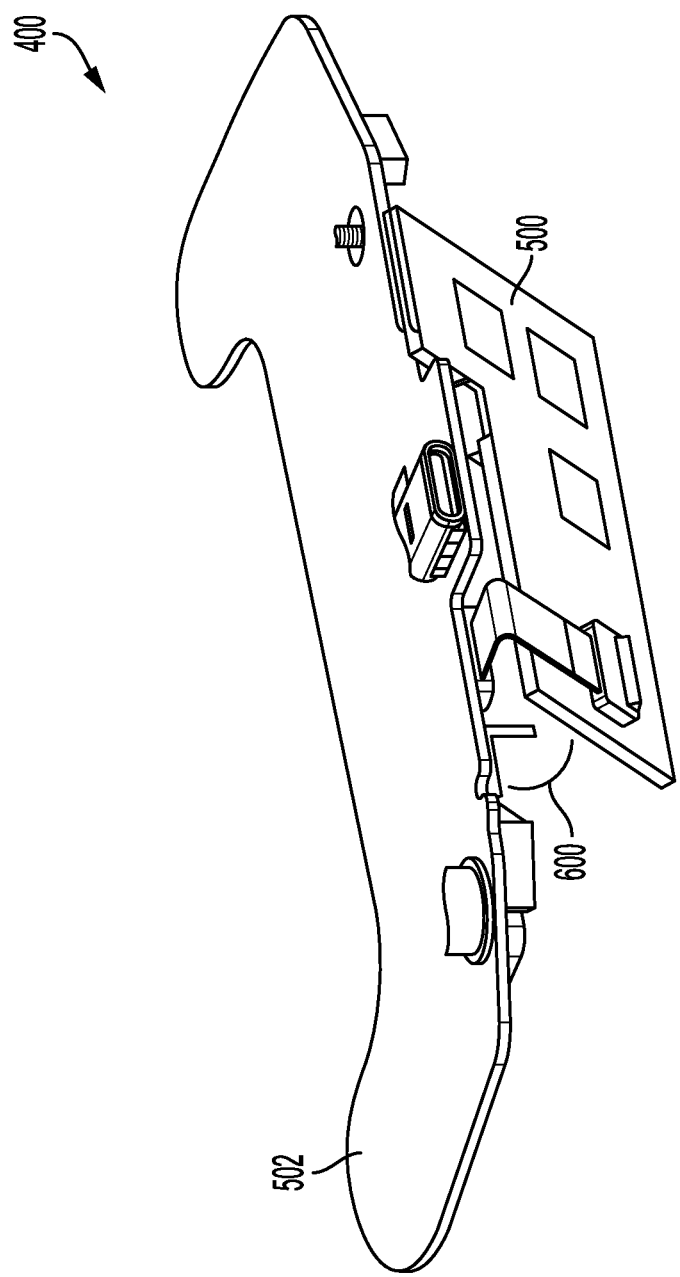
FIG. 6 is a perspective view of a first printed circuit board at an angle to a second printed circuit board according to some embodiments of the disclosure.

FIGS. 4 and 5 illustrate an example peripheral device 400. In this example, the peripheral device 400 is in the form of a gaming controller. The peripheral device 400 includes a printed circuit board (PCB) 500 and a printed circuit board (PCB) 502 that are oriented at an angle 600 (FIG. 6) to one another. The angle 600 between the PCB 500 and the PCB 502 may be any suitable angle between 0 degrees and 90 degrees. For example, the angle 600 may be about 45 degrees. In other examples, the angle 600 may be within a range of 40 to 50, 30 to 50, 40 to 60, 30 to 60, 20 to 60, 30 to 70, 20 to 70, 10 to 70, 20 to 80, 10 to 80, greater than 0 to 80, or 10 to 90 degrees. In any embodiment of the peripheral device 400, the angle 600 is subject to mechanical tolerance. As such, two different peripheral devices 400 can have a different angle 600 between the respective PCB 500 and the respective PCB 502 of the respective peripheral devices 400. The peripheral device 400 also includes a memory (not illustrated) and a processor (not illustrated) in communication with the memory. FIG. 6 illustrates the PCB 500 and the PCB 502 separate from the rest of the peripheral device 400 to more clearly illustrate the angle 600 between these two components. In at least some embodiments, the PCB 500 includes an ultra-wideband (UWB) antenna (not illustrated). In at least some embodiments, the PCB 502 is the mainboard of the peripheral device 400 and includes multiple positioning sensors. For example, the positioning sensors may include one or more of an accelerometer, a gyroscope, and a magnetometer. In various embodiments, the PCB 502 also includes the memory of the peripheral device 400 and the processor of the peripheral device 400.

Figure 7A:
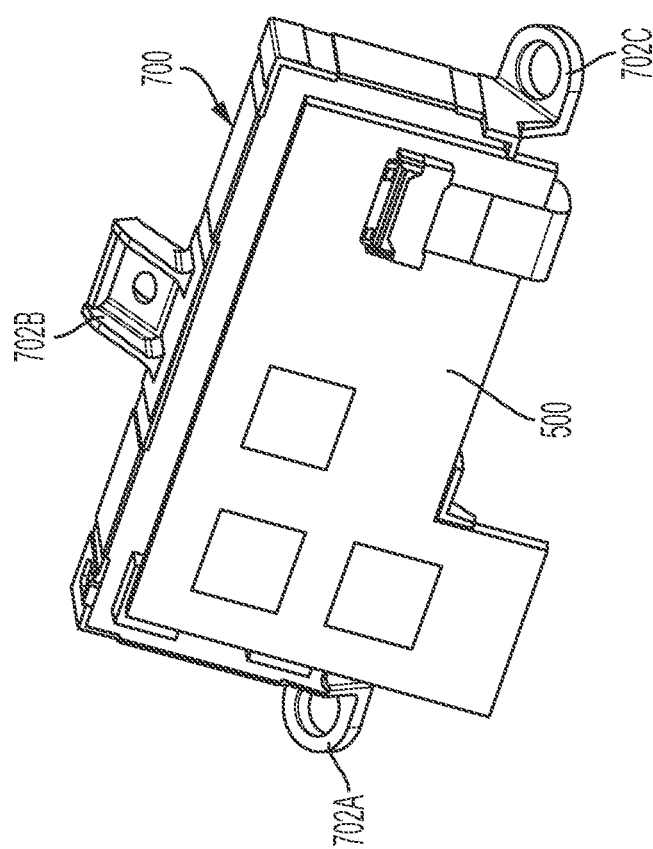
FIGS. 7A and 7B show a guiding structure for a printed circuit board according to some embodiments of the disclosure.
Figure 7B:
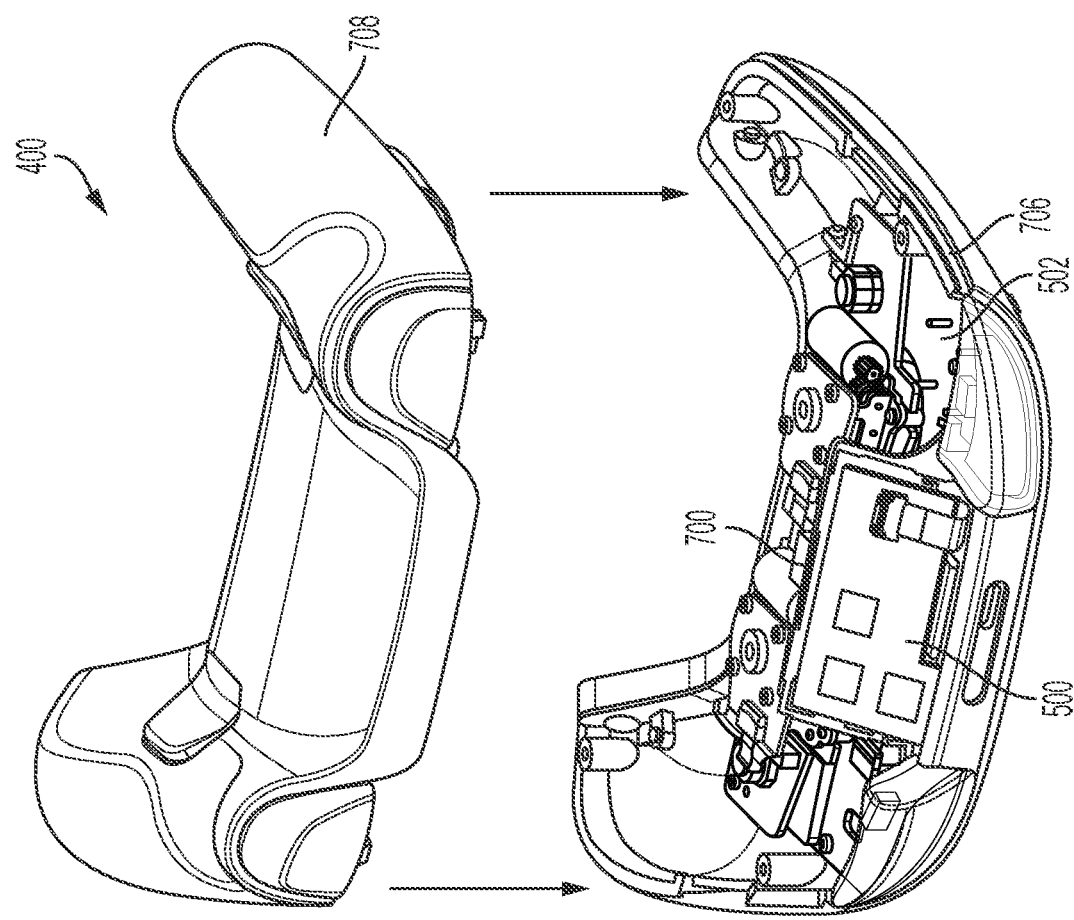

As stated above, the angle 600 between the PCB 500 and the PCB 502 may be subject to mechanical tolerance. In some embodiments, to help reduce this mechanical tolerance, the peripheral device 400 includes a guide structure that sets the PCB 500 into position and maintains that position. FIGS. 7A and 7B illustrate an example guide structure 700. The guide structure 700 slides over the PCB 500 and is attached to a front portion 706 of the peripheral device 400. For example, the guide structure 700 includes multiple attachment member openings 702A, 702B, 702C. An attachment member (e.g., a screw) may be positioned through each of the attachment member openings 702A, 702B, 702C and into the front portion 706 of the peripheral device 400 to attach the guide structure 700 to the front portion 706 of the peripheral device 400. The guide structure 700 is attached to the front portion 706 in a relatively consistent manner and therefore sets the PCB 500 in a relatively consistent orientation relative to the PCB 502. In some instances, however, mechanical tolerance can still remain. With the guide structure 700 attached to the front portion 706 of the peripheral device 400, a back portion 708 can be attached to the front portion 706. In some aspects, the guide structure 700 may be structured to support an additional component (e.g., a battery module) or structure of the peripheral device 400. In this way, the advantages of the guide structure 700 include allowing for component isolation from the PCB 500 for volumetric optimization, thermal isolation, and/or RF/antenna geometric isolation.

Figure 8:
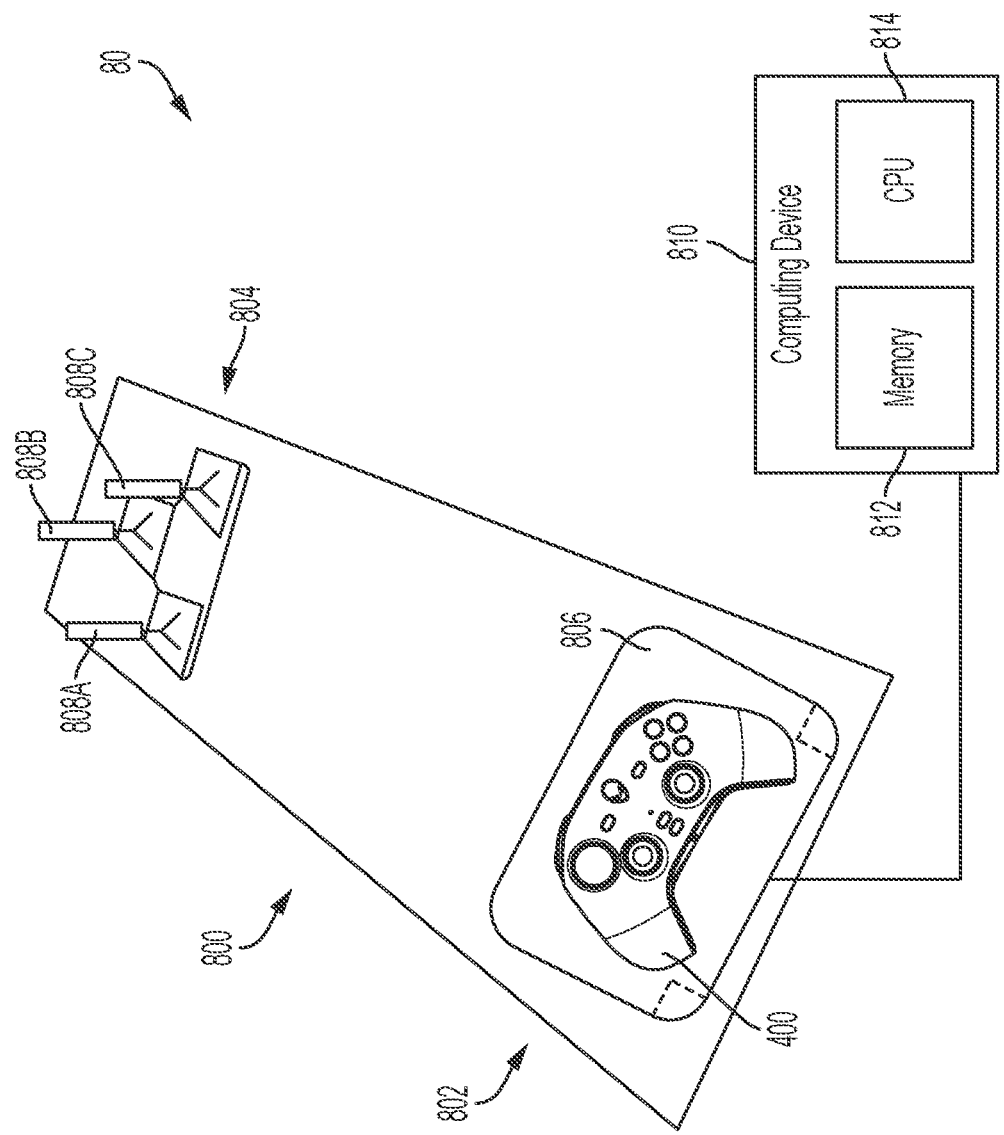
FIG. 8 is a system for calibrating a positioning algorithm of a peripheral device according to some embodiments of the disclosure.

Because of the mechanical tolerance, the position variance of the PCB 500 relative to the PCB 502 can lead to error in an output of a positioning algorithm that determines a position and orientation of the peripheral device 400 and can add extra computational/battery power to the peripheral device 400. The positioning algorithm is stored in the memory of the peripheral device 400 and is executed by the processor of the peripheral device 400. FIG. 8 illustrates a system 80 that calibrates the positioning algorithm of the peripheral device 400 to specific angle between the PCB 500 and the PCB 502 in order to address the problems created by the mechanical tolerance of the angled design. System 80 includes a testing apparatus 800. In various embodiments, the testing apparatus 800 may include a rigid board as a base that may be positioned on a table or other suitably flat and stable surface. In some embodiments, the rigid board may be integrated with its own support legs rather than being positioned on a table.

A first region 802 of the testing apparatus 800 includes a structure to receive the peripheral device 400 and to secure the peripheral device 400 in a particular orientation. For example, the structure may be a mold that the peripheral device 400 is placed on or snaps into. In some embodiments, the structure may be integral with the rigid board of the testing apparatus 800. In other embodiments, the structure may be integral with a tray 806 that is attached to the rigid board of the testing apparatus 800.

A second region 804 of the testing apparatus 800 is spaced apart from the first region 802. The second region 804 of the illustrated testing apparatus 800 includes wireless respondents 808A, 808B, and 808C. In other examples of the testing apparatus 800, the second region 804 may include another suitable quantity (e.g., 1, 2, 4, 5, etc.) of wireless respondents. The wireless respondents 808A, 808B, and 808C may be fixedly attached to the rigid board of the testing apparatus 800 or may be removable from rigid board. When the peripheral device 400 is secured in the first region 802 of the testing apparatus 800, each of the wireless respondents 808A, 808B, and 808C is at a respective predefined position relative to the peripheral device 400. More specifically, each of the wireless respondents 808A, 808B, and 808C is at a respective predefined position relative to the PCB 502. In some embodiments, each of the wireless respondents 808A, 808B, and 808C (or at least one wireless respondent compared to the other wireless respondents) may be positioned at a different angle to the rigid board of the testing apparatus 800.

System 80 further includes a computing device 810 that executes a calibration operation for the peripheral device 400. The computing device 810 includes a memory 812 in communication with a processor (e.g., a CPU 814). In various embodiments the computing device 810 may be an information handling system (e.g., the information handling system 1000 described below). The computing device 810 may be in communication with the peripheral device 400 when the peripheral device 400 is secured in the first region 802 of the testing apparatus 400. In some embodiments, the computing device 810 may be in wired communication (e.g., USB-C cable) with the peripheral device 400. For example, a cable may plug directly into the computing device 810 and the peripheral device 400. In another example, the peripheral device 400 may be connected to the tray 806 (e.g., via a USB connection) and a cable may plug directly into the computing device 810 and the tray 806. In other embodiments, the computing device 810 may be in wireless communication (e.g., WiFi, etc.) with the peripheral device 400.

To perform the calibration operation, the computing device 810 determines, for each of the of wireless respondents 808A, 808B, 808C, a vector from the PCB 500 (e.g., from the UWB antenna on the PCB 500) to a wireless respondent of the wireless respondents 808A, 808B, 808C. Stated differently, the computing device 810 determines a first vector from the PCB 500 to the wireless respondent 808A, a second vector from the PCB 500 to the wireless respondent 808B, and a third vector from the PCB 500 to the wireless respondent 808C. The vectors may be determined based on one or more signals received from the wireless respondents 808A, 808B, 808C.

The computing device 810 then generates a calibration vector based on the determined vectors (i.e. the first, second, and third vectors) and a plurality of predefined vectors from the PCB 502 to each of the wireless respondents 808A, 808B, and 808C. In at least some embodiments, the calibration vector is a sum of the determined vectors and the predefined vectors. As stated above, each of the wireless respondents 808A, 808B, and 808C is at a respective predefined position relative to the PCB 502 when the peripheral device 400 is secured in the first region 802 of the testing apparatus 800. Vectors from the PCB 502 to the wireless respondent 808A, from the PCB 502 to the wireless respondent 808B, and from the PCB 502 to the wireless respondent 808C are therefore known and predefined. Conversely, the vectors from the PCB 500 to the wireless respondents 808A, 808B, and 808C are not known because the angle 600 between the PCB 500 and the PCB 502 is not known, and therefore the vectors from the PCB 500 to the wireless respondents 808A, 808B, and 808C are determined as stated above.

In at least some embodiments, the computing device 810 may store the generated calibration vector in the memory of the peripheral device 400. The positioning algorithm stored in the memory of the peripheral device 400 may utilize the stored calibration vector in order to determine a position (e.g., location) and/or orientation of the peripheral device 400 in an environment of the peripheral device 400. For instance, the positioning algorithm may take into account a summation of a vector indicative of a direction that the PCB 500 is pointing (e.g., a vector from the UWB antenna on the PCB 500) and a vector indicative of a direction that the positioning sensor(s) on the PCB 502 are pointing. The calibration vector is a transformation vector that enables the summation of the vector indicative of a direction that the PCB 500 is pointing and the vector indicative of a direction that the positioning sensor(s) on the PCB 502 are pointing.

Figure 9:
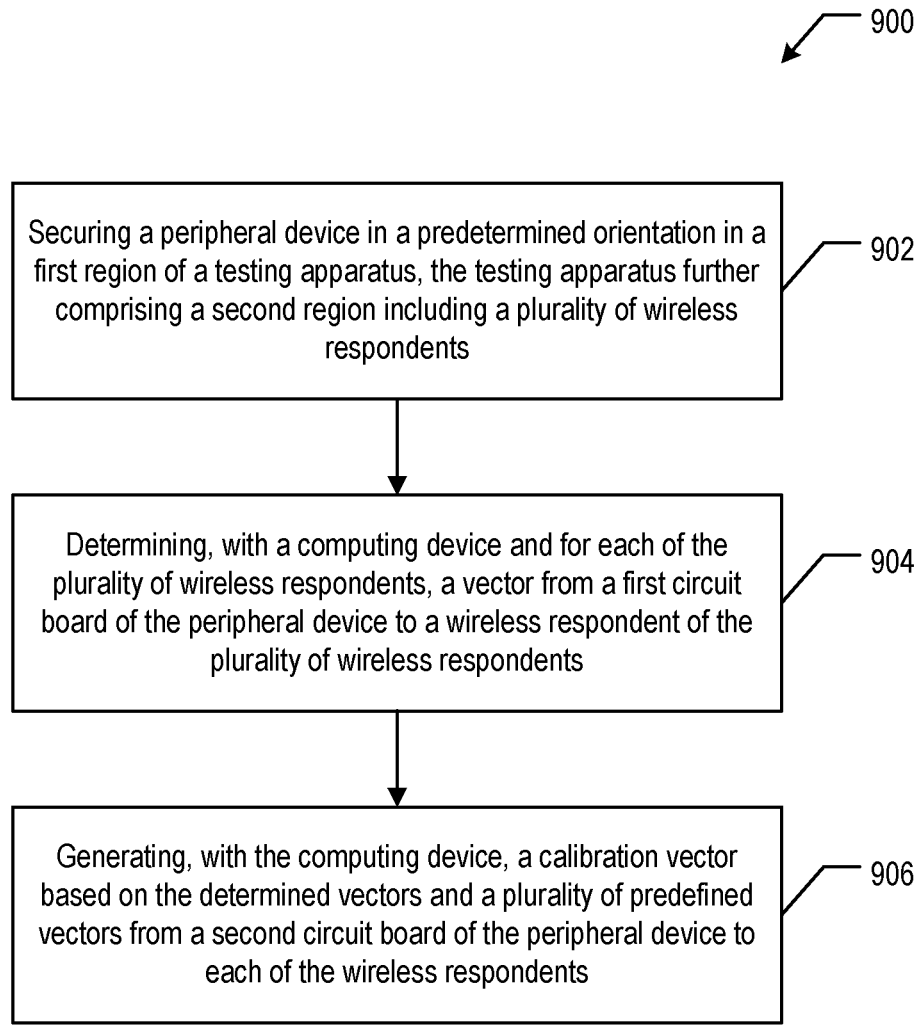
FIG. 9 is a method for generating a calibration vector according to some embodiments of the disclosure.

FIG. 9 illustrates an example method 900 for generating a calibration vector for a peripheral device. In at least some embodiments, the generated calibration vector is used for executing/calibrating a positioning algorithm of the peripheral device. At block 902, a peripheral device (e.g., the peripheral device 400) is secured in a predetermined orientation in a first region of a testing apparatus (e.g., the testing apparatus 800). The testing apparatus 800 further includes a second region including a plurality of wireless respondents (e.g., the wireless respondents 808A, 808B, and 808C). The peripheral device 400 includes a first printed circuit board (e.g., the PCB 500) at an angle (e.g., the angle 600) to a second printed circuit board (e.g., the PCB 502). In various embodiments, the angle may be within a range of 40 to 50 degrees. The PCB 500 includes an ultra-wideband (UWB) antenna and the PCB 502 includes at least one positioning sensor. In various embodiments, the at least one positioning sensor includes one or more in the group consisting of an accelerometer, a gyroscope, and a magnetometer.

At block 904, a vector is determined, with a computing device (e.g., the computing device 810) and for each of the wireless respondents 808A, 808B, and 808C, from a first circuit board (e.g., the PCB 500) of the peripheral device 400 to a wireless respondent of the wireless respondents 808A, 808B, and 808C. Stated differently, the computing device 810 determines a first vector from the PCB 500 to the wireless respondent 808A, a second vector from the PCB 500 to the wireless respondent 808B, and a third vector from the PCB 500 to the wireless respondent 808C.

At block 906, a calibration vector is generated with the computing device 810 based on the determined vectors and a plurality of predefined vectors from the PCB 502 of the peripheral device 400 to each of the wireless respondents 808A, 808B, and 808C. In at least some embodiments, the calibration vector is a sum of the determined vectors and the predefined vectors. In various embodiments, the method 900 may further include storing the calibration vector in a memory of the peripheral device 400.

Figure 10:
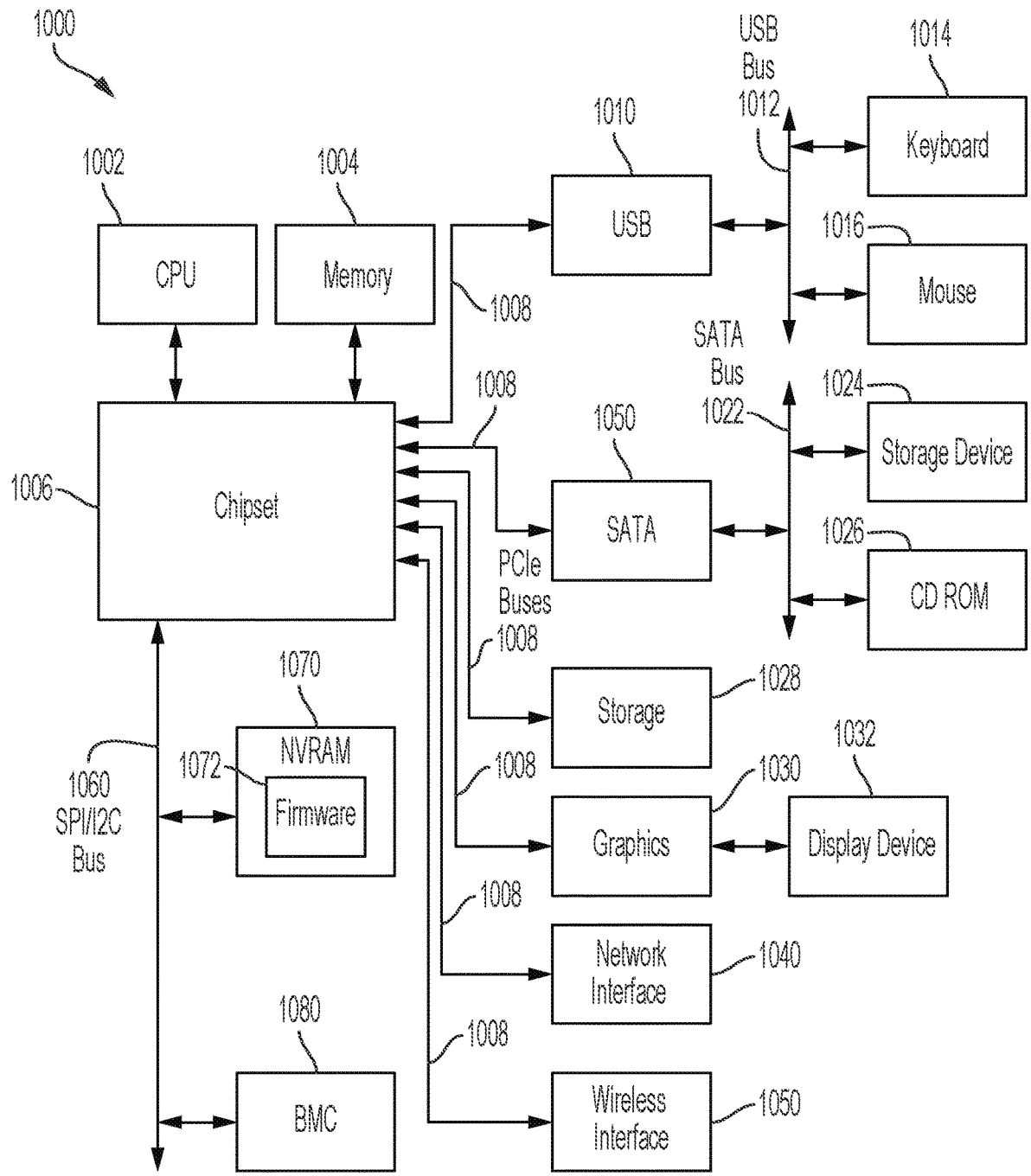
FIG. 10 is a schematic block diagram of an example information handling system according to some embodiments of the disclosure.

FIG. 10 illustrates an example information handling system 1000. Information handling system 1000 may include a processor 1002 (e.g., a central processing unit (CPU)), a memory (e.g., a dynamic random-access memory (DRAM)) 1004, and a chipset 1006. In some embodiments, one or more of the processor 1002, the memory 1004, and the chipset 1006 may be included on a motherboard (also referred to as a mainboard), which is a printed circuit board (PCB) with embedded conductors organized as transmission lines between the processor 1002, the memory 1004, the chipset 1006, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1002, the memory 1004, the chipset 1006, and/or other components may be organized as a System on Chip (SoC).

The processor 1002 may execute program code by accessing instructions loaded into memory 1004 from a storage device, executing the instructions to operate on data also loaded into memory 1004 from a storage device, and generate output data that is stored back into memory 1004 or sent to another component. The processor 1002 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1002 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1006 may facilitate the transfer of data between the processor 1002, the memory 1004, and other components. In some embodiments, chipset 1006 may include two or more integrated circuits (ICs), such as a northbridge controller coupled to the processor 1002, the memory 1004, and a southbridge controller, with the southbridge controller coupled to the other components such as USB 1010, SATA 1020, and PCIe buses 1008. The chipset 1006 may couple to other components through one or more PCIe buses 1008.

Some components may be coupled to one bus line of the PCIe buses 1008, whereas some components may be coupled to more than one bus line of the PCIe buses 1008. One example component is a universal serial bus (USB) controller 1010, which interfaces the chipset 1006 to a USB bus 1012. A USB bus 1012 may couple input/output components such as a keyboard 1014 and a mouse 1016, but also other components such as USB flash drives, or another information handling system. Another example component is a SATA bus controller 1020, which couples the chipset 1006 to a SATA bus 1022. The SATA bus 1022 may facilitate efficient transfer of data between the chipset 1006 and components coupled to the chipset 1006 and a storage device 1024 (e.g., a hard disk drive (HDD) or solid-state disk drive (SDD)) and/or a compact disc read-only memory (CD-ROM) 1026. The PCIe bus 1008 may also couple the chipset 1006 directly to a storage device 1028 (e.g., a solid-state disk drive (SDD)). A further example of an example component is a graphics device 1030 (e.g., a graphics processing unit (GPU)) for generating output to a display device 1032, a network interface controller (NIC) 1040, and/or a wireless interface 1050 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1006 may also be coupled to a serial peripheral interface (SPI) and/or Inter-Integrated Circuit (I2C) bus 1060, which couples the chipset 1006 to system management components. For example, a non-volatile random-access memory (NVRAM) 1070 for storing firmware 1072 may be coupled to the bus 1060. As another example, a controller, such as a baseboard management controller (BMC) 1080, may be coupled to the chipset 1006 through the bus 1060. BMC 1080 may be referred to as a service processor or embedded controller (EC). Capabilities and functions provided by BMC 1080 may vary considerably based on the type of information handling system. For example, the term baseboard management system may be used to describe an embedded processor included at a server, while an embedded controller may be found in a consumer-level device. As disclosed herein, BMC 1080 represents a processing device different from processor 1002, which provides various management functions for information handling system 1000. For example, an embedded controller may be responsible for power management, cooling management, and the like. An embedded controller included at a data storage system may be referred to as a storage enclosure processor or a chassis processor.

System 1000 may include additional processors that are configured to provide localized or specific control functions, such as a battery management controller. Bus 1060 can include one or more busses, including a Serial Peripheral Interface (SPI) bus, an Inter-Integrated Circuit (I2C) bus, a system management bus (SMBUS), a power management bus (PMBUS), or the like. BMC 1080 may be configured to provide out-of-band access to devices at information handling system 1000. Out-of-band access in the context of the bus 1060 may refer to operations performed prior to execution of firmware 1072 by processor 1002 to initialize operation of system 1000.

Firmware 1072 may include instructions executable by processor 102 to initialize and test the hardware components of system 1000. For example, the instructions may cause the processor 1002 to execute a power-on self-test (POST). The instructions may further cause the processor 1002 to load a boot loader or an operating system (OS) from a mass storage device. Firmware 1072 additionally may provide an abstraction layer for the hardware, such as a consistent way for application programs and operating systems to interact with the keyboard, display, and other input/output devices. When power is first applied to information handling system 1000, the system may begin a sequence of initialization procedures, such as a boot procedure or a secure boot procedure. During the initialization sequence, also referred to as a boot sequence, components of system 1000 may be configured and enabled for operation and device drivers may be installed. Device drivers may provide an interface through which other components of the system 1000 can communicate with a corresponding device. The firmware 1072 may include a basic input-output system (BIOS) and/or include a unified extensible firmware interface (UEFI). Firmware 1072 may also include one or more firmware modules of the information handling system. Additionally, configuration settings for the firmware 1072 and firmware of the information handling system 1000 may be stored in the NVRAM 1070. NVRAM 1070 may for example, be a non-volatile firmware memory of the information handling system 1000 and may store a firmware memory map namespace 1000 of the information handling system. NVRAM 1070 may further store one or more container-specific firmware memory map namespaces for one or more containers concurrently executed by the information handling system.

Information handling system 1000 may include additional components and additional busses, not shown for clarity. For example, system 1000 may include multiple processor cores (either within processor 1002 or separately coupled to the chipset 1006 or through the PCIe buses 1008), audio devices (such as may be coupled to the chipset 1006 through one of the PCIe busses 1008), or the like. While a particular arrangement of bus technologies and interconnections is illustrated for the purpose of example, one of skill will appreciate that the techniques disclosed herein are applicable to other system architectures. System 1000 may include multiple processors and/or redundant bus controllers. In some embodiments, one or more components may be integrated together in an integrated circuit (IC), which is circuitry built on a common substrate. For example, portions of chipset 1006 can be integrated within processor 1002. Additional components of information handling system 1000 may include one or more storage devices that may store machine-executable code, one or more communications ports for communicating with external devices, and various input and output (I/O) devices, such as a keyboard, a mouse, and a video display.

In some embodiments, processor 1002 may include multiple processors, such as multiple processing cores for parallel processing by the information handling system 1000. For example, the information handling system 1000 may include a server comprising multiple processors for parallel processing. In some embodiments, the information handling system 1000 may support virtual machine (VM) operation, with multiple virtualized instances of one or more operating systems executed in parallel by the information handling system 1000. For example, resources, such as processors or processing cores of the information handling system may be assigned to multiple containerized instances of one or more operating systems of the information handling system 1000 executed in parallel. A container may for example, be a virtual machine executed by the information handling system 1000 for execution of an instance of an operating system by the information handling system 1000. Thus, for example, multiple users may remotely connect to the information handling system 1000, such as in a cloud computing configuration, to utilize resources of the information handling system 1000, such as memory, processors, and other hardware, firmware, and software capabilities of the information handling system 1000. Parallel execution of multiple containers by the information handling system 1000 may allow the information handling system 1000 to execute tasks for multiple users in parallel secure virtual environments.

The schematic or flow chart diagrams of FIG. 9 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system, comprising:
   a peripheral device comprising a first printed circuit board at an angle to a second printed circuit board, wherein the first printed circuit board includes an ultra-wideband (UWB) antenna and the second printed circuit board includes at least one positioning sensor;
   a testing apparatus comprising a first region configured to secure the peripheral device in a predetermined orientation and a second region including a plurality of wireless respondents; and
   a computing device in communication with the peripheral device when the peripheral device is secured in the first region of the testing apparatus, wherein the computing device comprises:
   a memory; and
   a processor in communication with the memory, the processor configured to perform the operations comprising:
   determining, for each of the plurality of wireless respondents, a vector from the first printed circuit board to a wireless respondent of the plurality of wireless respondents; and
   generating a calibration vector based on the determined vectors and a plurality of predefined vectors from the second printed circuit board to each of the wireless respondents.

2. The system of claim 1, wherein the angle is within a range of 40 to 50 degrees.

3. The system of claim 1, wherein the at least one positioning sensor includes an accelerometer, a gyroscope, and a magnetometer.

4. The system of claim 1, wherein the peripheral device further comprises:
   a chassis configured to house the first and second printed circuit boards; and
   a guide structure configured to attach to the chassis and thereby maintain a positioning of the first printed circuit board.

5. The system of claim 1, wherein the second region of the testing apparatus includes three wireless respondents spaced from one another at predetermined distances.

6. The system of claim 1, wherein the testing apparatus comprises a body and a tray attached to the body, wherein the tray is the first region of the testing apparatus.

7. The system of claim 1, wherein the calibration vector is a sum of the determined vectors and the predefined vectors.

8. A method comprising:
   securing a peripheral device in a predetermined orientation in a first region of a testing apparatus, the testing apparatus further comprising a second region including a plurality of wireless respondents, wherein the peripheral device comprises a first printed circuit board at an angle to a second printed circuit board, wherein the first printed circuit board includes an ultra-wideband (UWB) antenna and the second printed circuit board includes at least one positioning sensor;
   determining, with a computing device and for each of the plurality of wireless respondents, a vector from the first printed circuit board of the peripheral device to a wireless respondent of the plurality of wireless respondents; and
   generating, with the computing device, a calibration vector based on the determined vectors and a plurality of predefined vectors from the second printed circuit board of the peripheral device to each of the wireless respondents.

9. The method of claim 8, wherein the angle is within a range of 40 to 50 degrees.

10. The method of claim 8, wherein the at least one positioning sensor includes an accelerometer, a gyroscope, and a magnetometer.

11. The method of claim 8, wherein the peripheral device further comprises:
a chassis configured to house the first and second printed circuit boards; and
a guide structure configured to attach to the chassis and thereby maintain a positioning of the first printed circuit board.

12. The method of claim 8, wherein the second region of the testing apparatus includes three wireless respondents spaced from one another at predetermined distances.

13. The method of claim 8, wherein the testing apparatus comprises a body and a tray attached to the body, wherein the tray is the first region of the testing apparatus.

14. The method of claim 8, wherein the calibration vector is a sum of the determined vectors and the predefined vectors.

15. An apparatus comprising:
a first printed circuit board including an ultra-wideband (UWB) antenna;
a second printed circuit board disposed at an angle to the first printed circuit board, the second printed circuit board including at least one positioning sensor;
a memory storing a positioning algorithm and a calibration vector, wherein the positioning algorithm is configured to determine at least one of a position of the apparatus and an orientation of the apparatus; and
a processor in communication with the memory, the processor configured to execute the positioning algorithm using the calibration vector,
wherein the positioning algorithm is configured to determine, based on the calibration vector, a summation of a vector indicative of a direction that the first printed circuit board is pointing and a vector indicative of a direction that the at least one positioning sensor on the second printed circuit board is pointing.

16. The apparatus of claim 15, wherein the angle is within a range of 40 to 50 degrees.

17. The apparatus of claim 15, wherein the at least one positioning sensor includes an accelerometer, a gyroscope, and a magnetometer.

18. The apparatus of claim 15, further comprising:
a chassis configured to house the first and second printed circuit boards; and
a guide structure configured to attach to the chassis and thereby maintain a positioning of the first printed circuit board.

19. The apparatus of claim 15, wherein the calibration vector is determined by a calibration method that generates a sum of: (1) a plurality of vectors from the first printed circuit board to a plurality of wireless respondents and (2) a plurality of vectors from the second printed circuit board to the plurality of wireless respondents.

* * * * *